(12) United States Patent
Von Der Weiden et al.

(10) Patent No.: US 11,980,894 B2
(45) Date of Patent: May 14, 2024

(54) SHREDDER DEVICE FOR FOODSTUFFS

(71) Applicant: SEPAgrind GmbH, Overath (DE)

(72) Inventors: Helmut Von Der Weiden, Feilbingert (DE); Mark Dennis Achenbach, Biedenkopf (DE)

(73) Assignee: Packaging-& Cuttingsystems von der Weiden GmbH, Wörrstadt (DE)

( * ) Notice: Subject to any disclaimer, the term of this patent is extended or adjusted under 35 U.S.C. 154(b) by 428 days.

(21) Appl. No.: 17/442,273

(22) PCT Filed: Mar. 30, 2020

(86) PCT No.: PCT/IB2020/053012
§ 371 (c)(1),
(2) Date: Sep. 23, 2021

(87) PCT Pub. No.: WO2020/201988
PCT Pub. Date: Oct. 8, 2020

(65) Prior Publication Data
US 2022/0152622 A1 May 19, 2022

(30) Foreign Application Priority Data
Apr. 1, 2019 (DE) .......................... 102019002341.2

(51) Int. Cl.
*B02C 18/00* (2006.01)
*A01J 27/04* (2006.01)
(Continued)

(52) U.S. Cl.
CPC ............... *B02C 18/00* (2013.01); *A01J 27/04* (2013.01); *A22C 5/00* (2013.01); *A22C 17/0026* (2013.01); *A22C 25/20* (2013.01)

(58) Field of Classification Search
CPC .......... A22C 17/0026; B02C 2018/308; B02C 18/30; B02C 18/301; B02C 18/305; A01J 27/04
See application file for complete search history.

(56) References Cited

U.S. PATENT DOCUMENTS 2,582,244 A * 1/1952 Faith-Ell ............... B02C 18/301
241/82.3
2,841,197 A * 7/1958 Ardrey .................. B02C 18/301
241/82.2
(Continued)

FOREIGN PATENT DOCUMENTS

CN 204362836 U * 6/2015
CN 204362836 U 6/2015
(Continued)

*Primary Examiner* — Bobby Yeonjin Kim
(74) *Attorney, Agent, or Firm* — Hudak, Shunk & Farine Co. LPA

(57) ABSTRACT

A shredder device including a feed hopper, a screw conveyor and a shredder module, wherein the screw conveyor includes a screw conveyor shaft driven by a screw conveyor motor unit and having a screw conveyor flight formed thereon, and the shredder module includes a cutting drum having cutting openings formed therein, and a main screw rotatably arranged in the shredder module and having a main screw shaft, which is driven by a main screw motor unit, and a main screw flight which is formed thereon and passes over the cutting openings. The shredder device enables a higher cutting capacity. The main screw shaft is coaxially enclosed by the screw conveyor shaft inside the feed hopper up to the shredder module.

19 Claims, 3 Drawing Sheets

(51) Int. Cl.
  *A22C 5/00*   (2006.01)
  *A22C 17/00*  (2006.01)
  *A22C 25/20*  (2006.01)

(56) References Cited

U.S. PATENT DOCUMENTS

| | | | | |
|---|---|---|---|---|
| RE32,060 E | * | 12/1985 | McFarland | A22C 17/04 426/480 |
| 5,667,153 A | * | 9/1997 | Haack | B02C 18/30 241/82.5 |
| 2011/0284670 A1 | * | 11/2011 | Jenkins | B02C 7/188 241/6 |
| 2016/0030943 A1 | * | 2/2016 | York | B02C 18/301 241/30 |
| 2018/0071747 A1 | * | 3/2018 | Wight | B02C 18/365 |

FOREIGN PATENT DOCUMENTS

| | | | |
|---|---|---|---|
| DE | 4341606 A1 | 6/1995 | |
| DE | 19501966 A1 | 7/1996 | |
| EP | 0573759 A1 | 12/1993 | |
| EP | 2783572 A1 | 10/2014 | |
| RU | 1788882 A3 | 1/1993 | |
| WO | WO-2015140673 A1 * | 9/2015 | A22C 17/0026 |

* cited by examiner

SHREDDER DEVICE FOR FOODSTUFFS

FIELD OF THE INVENTION

The invention relates to a shredder device for foodstuffs comprising a feed hopper, a screw conveyor running at least in sections through the feed hopper and a shredder module following the screw conveyor in the axial direction (x), wherein the screw conveyor comprises a screw conveyor shaft driven by a screw conveyor motor unit and having a screw conveyor flight integrally formed thereon in sections, and the shredder module comprises a cutting drum having cutting openings formed therein, and a main screw rotatably arranged in the shredder module having a main screw shaft, which is driven by a main screw motor unit, and a main screw flight, which is formed thereon and passes over the cutting openings.

BACKGROUND OF THE INVENTION

In the past, so-called grinders were often used to chop up food such as meat, fish, cheese or fat, wherein grinders use a rotating knife to chop up the entire amount of food that is loaded.

Corresponding meat grinders are described in DE 43 41 606 A1 and DE 195 01 966 A1, which each have a feed hopper for the food to be chopped and a screw conveyor that pulls the food to be chopped from the feed hopper and transfers it to a main screw. The main screw carries the food to be chopped to a set of knives comprising several knives. The main disadvantage of the meat grinder is that unwanted residues such as bone splinters, tendons and sometimes also crushed foreign matter get into the ready-to-sell product. In addition, it has been found to be disadvantageous that the food to be shredded undergoes considerable revolutions in the transition area between the transport screw and the main screw, which reduces the degree of filling of the shredder module and the overall performance of the shredder device. In addition, the cleaning of the transition from the transport screw to the main screw in a hardly accessible area turns out to be particularly cumbersome, which in turn leads to long cleaning pauses and a further reduction in the overall cutting performance.

For a long time, efforts have been made to separate the unwanted residues from the usable food together with the comminution. A mincer for producing a boneless meat product is described in US Re. 32,060. The known device has a pressure housing with a cylindrical drum wall in which a screw conveyor is rotatably mounted. The screw conveyor consists of a transport screw and a main screw connected to it in a rotationally fixed manner, which differ in terms of their diameter, their pitch and the shape of the respective screw thread. Usable meat is separated from the bones by means of the main screw and cutting openings arranged in the cylindrical drum wall and pressed through the cutting openings. Bones that cannot be used are conveyed in the direction of an ejection opening arranged at the end and discharged from the pressure housing there. However, it has been found to be disadvantageous that the speed and torque of the transport screw and the main screw can only be set uniformly and the cutting performance of the main screw in particular is limited as a result.

Document EP 2 783 572 B1 discloses a comminuting device with a screw conveyor and a main screw, which are each arranged offset from one another in separate housings. The food to be chopped comes from the housing of the screw conveyor via an S-shaped connecting pipe into the housing of the main screw, which is provided with cutting openings and in which the food is shredded. The screw conveyor and the main screw each have their own motor. In operation, however, it has been found to be disadvantageous that the food has to be pushed by the screw conveyor over a relatively long distance through the S-shaped connecting pipe, which leads to considerable friction losses and circulation resistance have to be overcome, which have a negative effect on the cutting performance and service life of the shredder device.

SUMMARY OF THE INVENTION

The invention was therefore based on the object of developing a shredder device which enables an even higher cutting capacity of the foodstuff to be comminuted.

The object is achieved with a shredder device for foodstuffs, comprising: a feed hopper, a screw conveyor running at least in sections through the feed hopper, and a shredder module following the screw conveyor in an axial direction (x), wherein the screw conveyor comprises a screw conveyor shaft driven by a screw conveyor motor unit and having a screw conveyor flight integrally formed thereon in sections, and the shredder module comprises a cutting drum having cutting openings formed therein, and a main screw rotatably arranged in the shredder module having a main screw shaft, which is driven by a main screw motor unit, and a main screw flight, which is formed thereon and passes over the cutting openings, wherein the main screw shaft is coaxially enclosed by the screw conveyor shaft inside the feed hopper up to the shredder module. The screw conveyor and the main screw are typically aligned with one another in the axial direction. The screw conveyor is used to bring the food to be chopped up to the main screw and does not do any chopping work. Since there is no comminution work to be performed by the screw conveyor and a relatively low pressure is exerted on the food to be comminuted, only a relatively low torque needs to be provided. The outside diameter of the screw conveyor is usually chosen to be larger than the outside diameter of the main screw. Its main screw flight can preferably be formed in a section within the cutting drum on the main screw shaft and transport the food to be comminuted with high pressure over and into the cutting openings formed radially in the cutting drum.

The screw conveyor motor unit and the main screw motor unit are preferably separately controllable and each designed for the expected power requirement. With the help of the main screw motor unit, the main screw can be operated with a speed different from the screw conveyor and a torque designed for it. A further advantage of the invention consists in the fact that, due to a separate screw conveyor motor unit and main screw unit, a higher overall motor output can be installed with little effort and the overall food throughput can be increased considerably.

The main screw shaft is arranged coaxially to the screw conveyor shaft and enclosed by it. Because of this structural design, a section of the main screw shaft runs centrally within the screw conveyor shaft outside the shredder module.

The term "enclosed" means a casing or covering in the axial direction of the main screw shaft by the screw conveyor shaft, with no entry of the food to be shredded in the radial direction through the screw conveyor shaft to the main screw shaft being possible within the feed hopper up to the shredder module attached to it. As a result, the food to be chopped is rotated while being fed exclusively by the screw conveyor. In the area of the feed hopper, the main screw shaft does not transfer any work to the food to be shredded, so that it reaches the shredder module with reduced flexing work and the shredder device enables particularly high cutting performance. Because the main screw shaft is axially enclosed by the screw conveyor shaft, it is evacuated from the food to be shredded and does not need to be cleaned in the particularly difficult-to-access area at the outlet of the feed hopper.

In addition, it is possible to arrange the screw conveyor and the main screw in the axial direction one behind the other and in one plane, so that the food to be shredded is fed to the cutting drum in a straight line without deflections, which minimizes friction losses in the food to be shredded. This in turn ensures a high throughput of the food to be chopped, since the torque generated by the screw conveyor and the main screw is available to maximize the culling performance.

The screw conveyor and the main screw shaft run at least in sections through the feed hopper. A feed hopper is understood to be a tub-like container with an upper opening through which the food to be shredded is fed to the shredder device. The screw conveyor runs through the lower end of the feed hopper and from there pulls off the food that is to be comminuted from the feed hopper.

Within the section of the screw conveyor shaft running through the feed hopper, the main screw shaft is received by the screw conveyor shaft and evacuated from the feed hopper. This also has the advantage that the food to be shredded is contaminated neither by lubricant residues from the main screw shaft nor by abrasion when the shredder device is in operation.

An embodiment is particularly preferred in which only the main screw shaft of the main screw is enclosed by the screw conveyor shaft. Accordingly, there are no sections of the main screw flight within the area of the main screw shaft covered by the screw conveyor shaft. The outside diameter of the main screw shaft is matched to the inside diameter of the screw conveyor shaft in such a way that there is no contact under the expected operational loads and an annular space formed between the screw conveyor shaft and the main screw shaft is minimized. This results in the advantage that a free cross-section for the food to be shredded between the screw conveyor shaft and a passage opening to the shredder module can be particularly large, whereby an even higher cutting performance of the shredder device is possible.

The screw conveyor shaft is expediently designed as a closed tubular body in the axial extension over its entire axial length. This does not need to be a one-piece, integral unit, but covers the main screw shaft without a passage opening for the food to be chopped up.

It has been found to be particularly favorable if the screw conveyor motor unit and the main screw motor unit are arranged on a side of the screw conveyor facing away from the shredder module.

This results in a modular separation of the functional areas of food shredding and drive technology. The screw conveyor motor unit and the main screw motor unit can be arranged adjacent to one another and are therefore particularly easily accessible for maintenance purposes. Cable routing of electrical lines can also be reduced to a spatially delimited area which is arranged at a distance from the food to be shredded and is exposed to a significantly reduced exposure to splash water during cleaning work. In addition, the installation space around the shredder module remains largely free, so that both the usable food and the non-usable residues can be transported away by means of downstream conveying means that can be arranged largely as desired.

According to a particularly advantageous embodiment, the feed hopper has a first and second passage opening on opposite sides, through which the screw conveyor shaft and the main screw shaft are passed. The first passage opening can be arranged on a side of the feed hopper adjacent to the screw conveyor motor unit and the main screw motor unit and serve exclusively for the passage of the screw conveyor shaft and the main screw shaft mounted therein. The second passage opening is then arranged on a side of the feed hopper adjacent to the shredder module. The screw conveyor shaft with the screw conveyor flight formed thereon regularly extends into the second passage opening. In addition, the second passage opening forms a channel for the food to be comminuted from the feed hopper to the shredder module.

The shredder module is preferably fastened on the front side around the second passage opening. The food to be shredded passes directly from the second passage opening into the shredder module, which is oriented in an aligned extension to the second passage opening, whereby the food to be shredded enters the shredder module in a straight line and without deflection.

The screw conveyor shaft and the main screw shaft are expediently mounted in a common bearing block. This minimizes the installation space in the axial extension of the screw conveyor shaft and the main screw shaft. The common bearing block can be fixed to the feed hopper and spatially between this and the associated screw conveyor motor unit as well as the main screw motor unit.

In the axial extension of the bearing block, the screw conveyor shaft is expediently supported rotatably by means of several first screw conveyor bearings relative to the bearing block and the main screw shaft by means of at least one first main screw bearing relative to the screw conveyor shaft. The screw conveyor bearing and the main screw bearing are thus arranged within the bearing block and transfer the operating loads that occur both in the radial direction and in the axial direction to the bearing block. This has the advantage that no significant axial forces need to be absorbed on the side of the shredder module and bearings with correspondingly small dimensions and simple structures can be used, which means that the shredder module can be installed and removed particularly quickly, especially for repair and cleaning purposes.

The first screw conveyor bearings and the at least one first main screw bearing are preferably designed as roller bearings. Roller bearings are characterized by low bearing friction and a long service life. A possibly complex dismantling of the first screw conveyor bearing and the first main screw bearing only needs to be carried out in the event of repairs, since the section of the screw shaft and main screw shaft adjacent to the first screw bearing and the first main screw bearing does not need to be removed for cleaning work.

At the bearing block the screw conveyor shaft can have a screw conveyor disconnection point and the main screw shaft can have a main screw disconnection point. At this point, the corresponding shafts can be separated in front of the bearing block and pulled out of the feed hopper in the axial direction in the direction of the second passage opening.

The bearing block is advantageously arranged on an outside of the feed hopper around the first passage opening. The bearing block is consequently attached outside the feed hopper and does not come into contact with the food to be chopped. This installation position of the bearing block is particularly advantageous if the first screw conveyor bearing and the first main screw bearing are designed as roller bearings, since otherwise the bearing block would have to be additionally sealed against the ingress of food and/or the leakage of lubricant.

A centering insert is expediently inserted into the second passage opening, in which the screw conveyor shaft is rotatably supported by means of a second screw conveyor bearing and the main screw shaft is rotatably supported by a second main screw bearing. The centering insert accommodates the second screw conveyor bearing and the second main screw bearing in its central area. Open apertures in the axial direction are formed decentrally in the centering insert, through which the food to be shredded emerges from the second passage opening and enters the shredder module mounted to the second passage opening.

The second screw conveyor bearing and the second main screw bearing are expediently designed as plain bearings. The plain bearing can be made lubrication-free, is largely insensitive to the ingress of food during operation, so that no separate seal is necessary, and can be easily removed or dismantled for cleaning purposes.

The shredder module preferably comprises a pre-shredding drum which is arranged in the axial direction between the cutting drum and the second passage opening. The pre-shredding drum is used to roughly shred the food and to prepare it for the subsequent shredding and separation. For this purpose, the pre-shredding drum has a closed peripheral wall through which no foodstuff to be shredded passes.

Lands and grooves can be formed on the inside of the pre-shredding drum, by means of which a coarse shredding takes place. The grooves are shaped as a helical groove and penetrate the lands in the direction of the cutting drum. The food to be chopped is pressed into the grooves by the rotating main screw, is fixed in the grooves and is then sheared off by the main screw flight of the rotating main screw shaft that sweeps over the grooves.

BRIEF DESCRIPTION OF THE DRAWINGS

For a better understanding, the invention is explained in more detail below with reference to four figures showing in
FIG. 1: a perspective view from behind of a shredder device cut in the longitudinal direction.

DETAILED DESCRIPTION OF THE INVENTION

Figure 1:
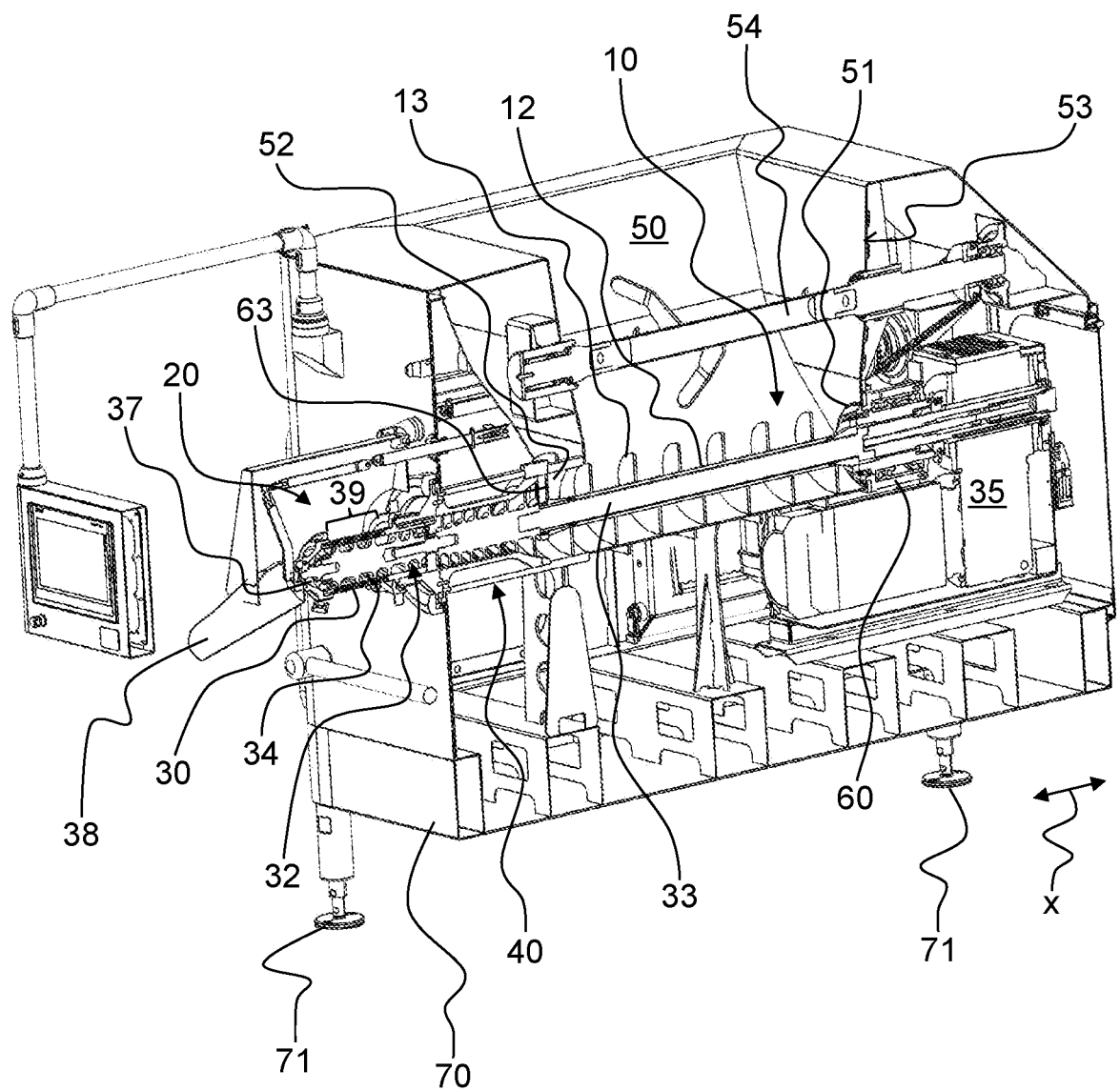

FIG. 1 shows a perspective view of a longitudinal section through the shredder device according to the invention, which has a machine frame 70 which is placed stationary on the floor by means of several support feet 71 attached to it. The machine frame 70 carries a feed hopper 50, which is open at the top, into which the food to be comminuted is placed, homogenized and loosened by a mixing shaft 54 running through the feed hopper 50.

At a lower end of the feed hopper 50 there is a screw conveyor 10 with which the food to be comminuted is fed to a shredder module 20. The shredder module 20 is arranged on the downstream side of the screw conveyor 10 in the axial direction x. The screw conveyor 10 comprises a screw conveyor shaft 12 and a screw conveyor flight 13, the screw conveyor shaft 12 being passed through a first passage opening 51 formed in the feed hopper 50 and being coupled to a screw conveyor motor unit 11, which can be seen particularly well in FIG. 2. In a second passage opening 52, which is arranged on the opposite side of the feed hopper 50 with respect to the first passage opening 51, the food to be comminuted enters the shredder module 20. A centering insert 63 is placed into the second passage opening 52.

The shredder module 20 has at its end a cylindrical cutting drum 30 with a plurality of radially oriented cutting openings 31 therein. In the axial direction x, the shredder module 20 is accomplished by a main screw 32 having a main screw flight 34 rotating over the cutting openings 31. By rotating the main screw 32, the main screw flight 34 pushes the food to be shredded in the direction of a discharge opening 37 through which the residues contained in the food emerge from the shredder module 20 and are removed by means of a residue chute 38.

The food to be used is relatively softer and is pressed into the cutting openings 31 due to the pressure built up by the main screw 32, held therein and sheared off due to the rotary movement of the main screw flight 34. A food discharge 39 occurs through the cutting openings 31.

The main screw 32 takes over the comminution work and has a separate main screw motor unit 35 for this purpose, which is kinematically coupled to a main screw shaft 33. The main screw shaft 33 extends in the axial direction through the shredder module 20 and is formed with the main screw flight 34 exclusively in this section. In the second passage opening 52, the main screw shaft 33 enters coaxially into the interior of the hollow screw conveyor shaft 12 and passes through it over its entire axial length. Within the feed hopper 50, the main screw shaft 33 is received by the screw conveyor shaft 12 and completely surrounded by it.

Figure 3:
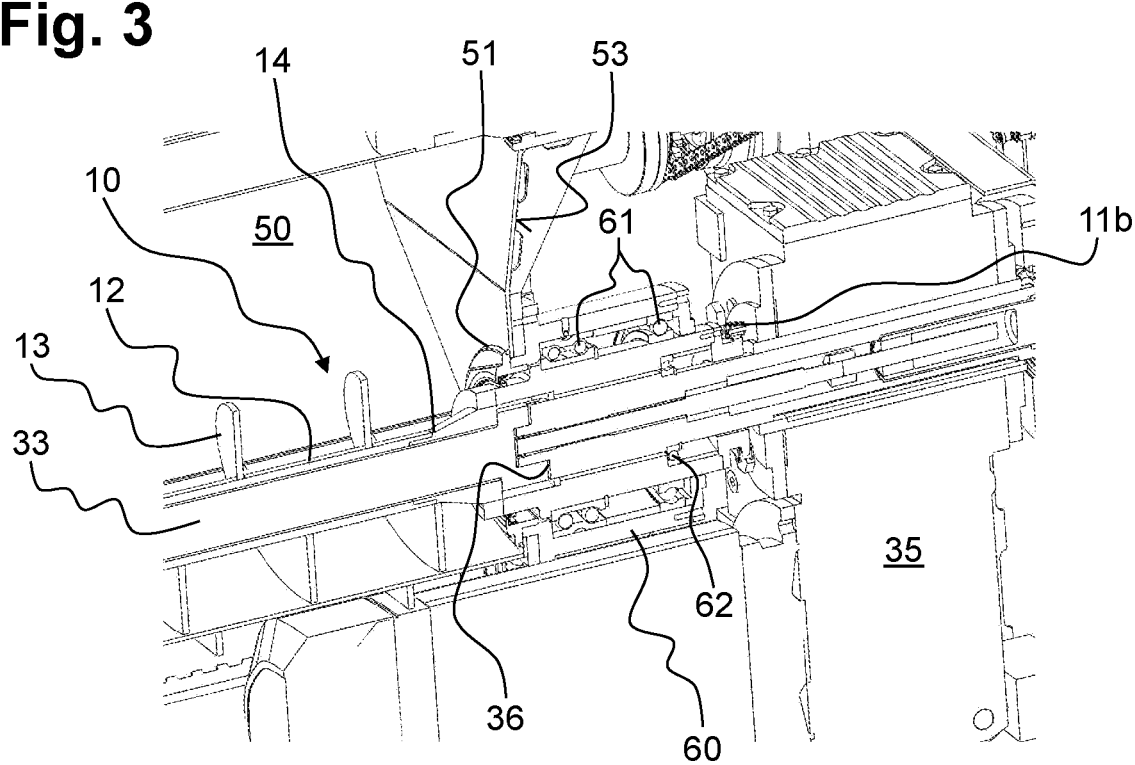
FIG. 3: an enlarged detail of a longitudinal section through the shredder device in the area of a bearing block.

FIG. 3 illustrates in an enlarged view the passage of the screw conveyor shaft 12 and the main screw shaft 33 mounted therein through the first passage opening 51 of the feed hopper 50. A bearing block 60, which absorbs the radial and axial forces of both the screw conveyor shaft 12 and the main screw shaft 33, is arranged in alignment with the first passage opening 51 on an outside 53 of the feed hopper 50. For this purpose, the bearing block 60 has a plurality of first screw conveyor bearings 61 arranged one behind the other in the axial direction x, which act on the screw conveyor shaft 12 from the outside. The main screw shaft 33 is supported with respect to the screw conveyor shaft 12 with a first main screw bearing 62, which is also overlapped by the bearing block 60 in the axial direction x.

Figure 2:
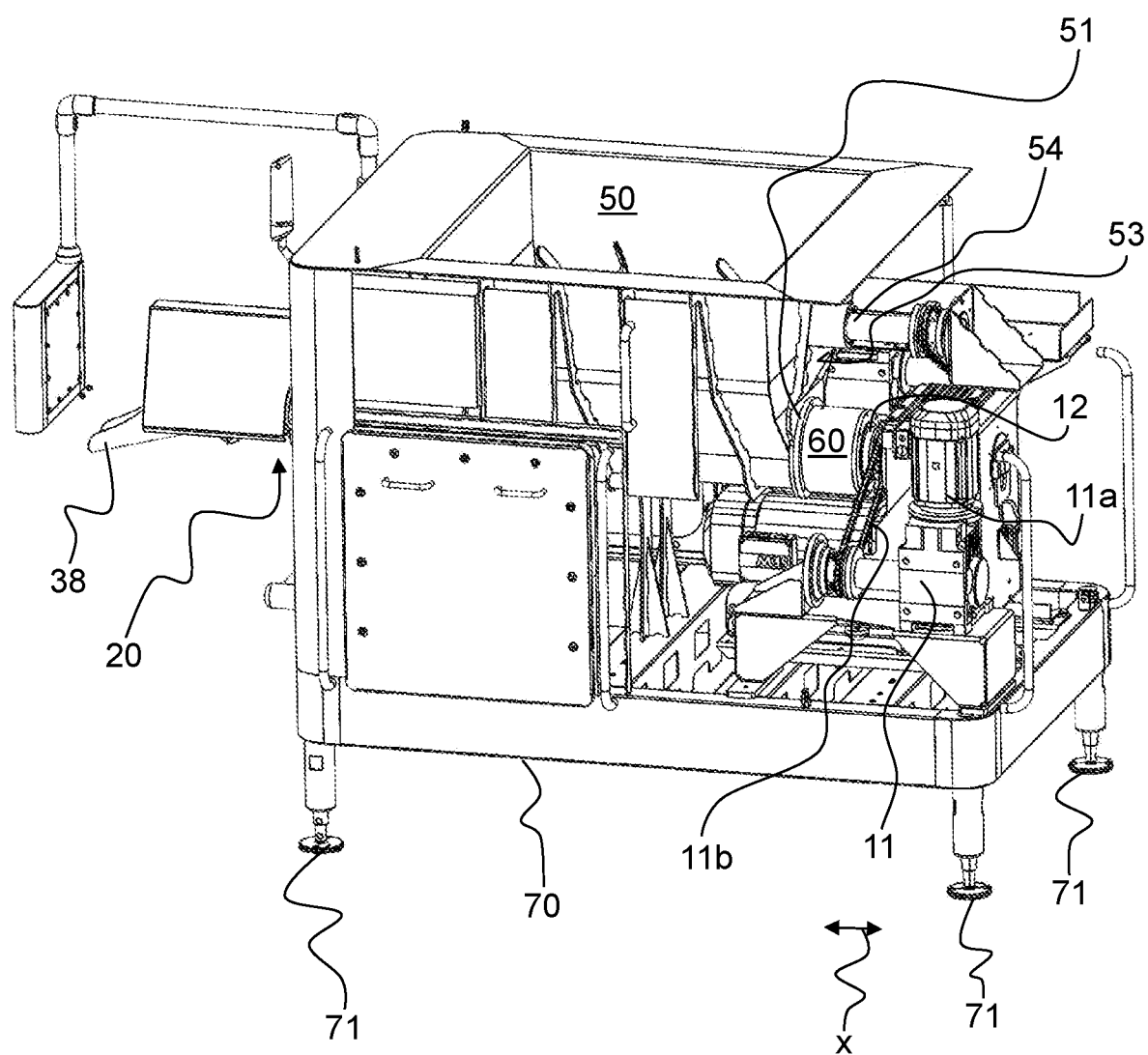
FIG. 2: a perspective side view from the front of the shredder device according to FIG. 1.

The screw conveyor shaft 12 is led out of the bearing block 60 on the side of the bearing block 60 facing away from the feed hopper 50 and is connected to the screw conveyor motor unit 11 shown in FIG. 2. In the exemplary embodiment shown, the screw conveyor motor unit 11 has a drive motor 11a and a power transmission means 11b in the form of a chain, into which a pinion which is fixedly formed on the screw conveyor shaft 12 engages.

The main screw shaft 33 also emerges from the bearing block 60 on the side facing away from the feed hopper 50 and projects beyond the screw conveyor shaft 12 in the axial direction x.

For simple dismantling, for example for cleaning or repair purposes, the screw conveyor 10 has a screw conveyor disconnection point 14 and the main screw 32 has a main screw disconnection point 36. The screw conveyor disconnection point 14 is formed in the immediate vicinity of the first passage opening 51 within the feed hopper 50 and is visible from above when the screw conveyor 10 is inserted into the shredder device, which considerably simplifies the insertion. The main screw disconnection point 36 is located offset in the axial direction x relative to the screw conveyor disconnection point 14 and is encompassed from the outside by the bearing block 60. The arrangement of the screw conveyor disconnection point 14 and main screw disconnection point 36 offset in the axial direction x also simplifies installation, since the screw conveyor 10 with the main screw shaft 33 inserted therein can be pushed in axially in the assembled state and contact their disconnection points 14, 36 one after the other.

Figure 4:
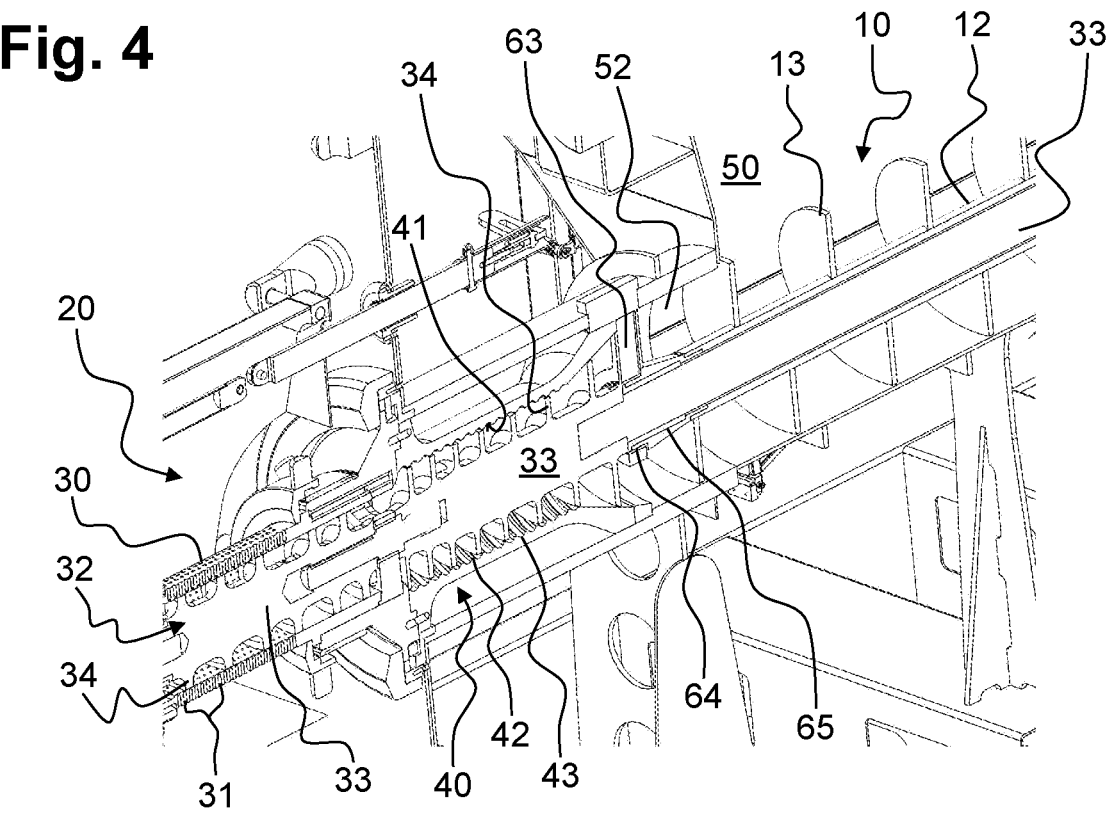
FIG. 4: an enlarged detail of a longitudinal section through the shredder device in the area of a shredder module.

FIG. 4 shows in an enlarged view the connection of the shredder module 20 to the second passage opening 52, in which the screw conveyor shaft 12 is rotatably received by means of a second screw conveyor bearing 64 carried by the centering insert 63. The second screw conveyor bearing 64 is formed from a bearing sleeve, on the outside of which the centering insert 63 and the inside of the hollow screw conveyor shaft 12 rests. The inside of the bearing sleeve forms a second main screw bearing 65 on which the outside of the main screw shaft 33 is supported.

The shredder module 20 also has a pre-shredding drum 40 which is attached to the front side of the cutting drum 30. An end of the pre-shredding drum 40 facing away from the cutting drum 30 engages the second passage opening 52 on the front side. On an inside 41, the pre-shredding drum 40 is provided with a surface made up of lands 42 and grooves 43. The grooves 43 form a spiral-like groove through the lands 42 and provide a wave-like surface. The main screw flight 34 of the section of the main screw 32 running axially through the pre-shredding drum 40 transports the food to be shredded in the direction of the cutting drum 30, with the food to be minced being pre-shredded at the lands 42 and grooves 43.

LIST OF REFERENCE NUMBERS

10 screw conveyor
11 screw conveyor motor unit
11a drive motor
11b power transmission means
12 screw conveyor shaft
13 screw conveyor flight
14 screw conveyor disconnection point
20 shredder module
30 cutting drum
31 cutting openings
32 main screw
33 main screw shaft
34 main screw flight
35 main screw motor unit
36 main screw disconnection point
37 discharge opening for residues
38 residue chute
39 food discharge
40 pre-shredding drum
41 inside of the pre-shredding drum
42 lands
43 grooves
50 feed hopper
51 first passage opening
52 second passage opening
53 outside feed hopper
54 mixing shaft
60 bearing block
61 first screw conveyor bearing
62 first main screw bearing
63 centering insert
64 second screw conveyor bearing
65 second main screw bearing
70 machine frame
71 support feet
x axial direction

What is claimed is:

1. A shredder device for foodstuffs, comprising: a feed hopper, a screw conveyor running at least in sections through the feed hopper, and a shredder module following the screw conveyor in an axial direction (x), wherein the screw conveyor comprises a screw conveyor shaft driven by a screw conveyor motor unit and having a screw conveyor flight integrally formed thereon in sections, and the shredder module comprises a cutting drum having cutting openings formed therein, and a main screw rotatably arranged in the shredder module having a main screw shaft, which is driven by a main screw motor unit, and a main screw flight, which is formed thereon and passes over the cutting openings, wherein the main screw shaft is coaxially enclosed by the screw conveyor shaft inside the feed hopper up to the shredder module, and wherein only the main screw shaft of the main screw is enclosed by the screw conveyor shaft.

2. The shredder device according to claim 1, wherein the screw conveyor shaft is designed as a closed tubular body in the axial direction.

3. The shredder device according to claim 1, wherein the screw conveyor motor unit and the main screw motor unit are arranged on a side of the screw conveyor facing away from the shredder module.

4. The shredder device according to claim 1, wherein the feed hopper has a first and second passage opening on opposite sides through which the screw conveyor shaft and the main screw shaft are passed.

5. The shredder device according to claim 4, wherein the shredder module is fastened on the front side around the second passage opening.

6. The shredder device according to claim 4, wherein the screw conveyor shaft and the main screw shaft are mounted in a common bearing block.

7. The shredder device according to claim 6, wherein within the axial direction (x) of the bearing block the screw conveyor shaft is rotatably supported by several first screw conveyor bearings with respect to the bearing block and the main screw shaft is rotatably supported by at least one first main screw bearing relative to the screw conveyor shaft.

8. The shredder device according to claim 7, wherein the first screw conveyor bearings and the at least one first main screw bearing are designed as roller bearings.

9. The shredder device according to claim 6, wherein at the bearing block the screw conveyor shaft has a screw conveyor disconnection point and the main screw shaft has a main screw disconnection point.

10. The shredder device according to claim 6, wherein the bearing block is arranged on an outside of the feed hopper around the first passage opening.

11. The shredder device according to claim 4, wherein a centering insert is inserted into the second passage opening, in which the screw conveyor shaft is rotatably supported by of a second screw conveyor bearing and the main screw shaft is rotatably supported by a second main screw bearing.

12. The shredder device according to claim 11, wherein the second screw conveyor bearing and the second main screw bearing are designed as slide bearings.

13. The shredder device according to claim 4, wherein the shredder module comprises a pre-shredding drum which is arranged in the axial direction (x) between the cutting drum and the second passage opening.

14. The shredder device according to claim 13, wherein lands and grooves are formed on an inner side of the pre-shredding drum.

15. The shredder device according to claim 2, wherein the screw conveyor shaft is designed as a closed tubular body in the axial direction, and wherein the screw conveyor motor unit and the main screw motor unit are arranged on a side of the screw conveyor facing away from the shredder module.

16. The shredder device according to claim 15, wherein the feed hopper has a first and second passage opening on opposite sides through which the screw conveyor shaft and the main screw shaft are passed, wherein the shredder module is fastened on the front side around the second passage opening, and wherein the screw conveyor shaft and the main screw shaft are mounted in a common bearing block.

17. The shredder device according to claim 16, wherein within the axial direction (x) of the bearing block the screw conveyor shaft is rotatably supported by several first screw conveyor bearings with respect to the bearing block and the main screw shaft is rotatably supported by at least one first main screw bearing relative to the screw conveyor shaft, wherein the first screw conveyor bearings and the at least one first main screw bearing are designed as roller bearings, and wherein at the bearing block the screw conveyor shaft has a screw conveyor disconnection point and the main screw shaft has a main screw disconnection point.

18. The shredder device according to claim 17, wherein the bearing block is arranged on an outside of the feed hopper around the first passage opening, and wherein a centering insert is inserted into the second passage opening, in which the screw conveyor shaft is rotatably supported by a second screw conveyor bearing and the main screw shaft is rotatably supported by a second main screw bearing.

19. The shredder device according to claim 18, wherein the second screw conveyor bearing and the second main screw bearing are designed as slide bearings, and wherein the shredder module comprises a pre-shredding drum which is arranged in the axial direction (x) between the cutting drum and the second passage opening.

\* \* \* \* \*

UNITED STATES PATENT AND TRADEMARK OFFICE
CERTIFICATE OF CORRECTION

PATENT NO. : 11,980,894 B2
APPLICATION NO. : 17/442273
DATED : May 14, 2024
INVENTOR(S) : Von Der Weiden et al.

It is certified that error appears in the above-identified patent and that said Letters Patent is hereby corrected as shown below:

On the Title Page

Item (73), replace the Assignee "Packaging- & Cuttingsystems von der Weiden GmbH, Wörrstadt (DE)" with:

--SEPAgrind GmbH, Overath (DE)--

Signed and Sealed this
Twelfth Day of November, 2024

Katherine Kelly Vidal
*Director of the United States Patent and Trademark Office*